US011249560B2

(12) United States Patent
Marquis et al.

(10) Patent No.: US 11,249,560 B2
(45) Date of Patent: Feb. 15, 2022

(54) CAPACITY COUNTER SYSTEM

(71) Applicant: KimchuK, Incorporated, Danbury, CT (US)

(72) Inventors: James Alphonse Marquis, Danbury, CT (US); Jeffrey William Londona, Ridgefield, CT (US); John William Dailey, Terryville, CT (US)

(73) Assignee: KimchuK, Incorporated, Danbury, CT (US)

( * ) Notice: Subject to any disclaimer, the term of this patent is extended or adjusted under 35 U.S.C. 154(b) by 0 days.

(21) Appl. No.: 17/304,386

(22) Filed: Jun. 21, 2021

(65) Prior Publication Data

US 2021/0405768 A1 Dec. 30, 2021

Related U.S. Application Data

(60) Provisional application No. 62/705,471, filed on Jun. 29, 2020.

(51) Int. Cl.
| | |
|---|---|
| *G06F 3/03* | (2006.01) |
| *G06M 1/22* | (2006.01) |
| *H04W 4/80* | (2018.01) |
| *H04W 84/12* | (2009.01) |
| *G06M 1/10* | (2006.01) |
| *G06M 3/06* | (2006.01) |

(52) U.S. Cl.
CPC ............. *G06F 3/03* (2013.01); *G06M 1/22* (2013.01); *G06M 1/108* (2013.01); *G06M 3/06* (2013.01); *H04W 4/80* (2018.02); *H04W 84/12* (2013.01)

(58) Field of Classification Search
CPC . G06F 3/03; G06M 1/22; G06M 3/06; G06M 1/108; H04W 84/12; H04W 4/80
See application file for complete search history.

(56) References Cited

U.S. PATENT DOCUMENTS

| | | | |
|---|---|---|---|
| 2,572,784 A * | 10/1951 | Van Veen | G06M 1/041 |
| | | | 235/117 A |
| 2010/0030637 A1* | 2/2010 | Koplar | H04N 7/17318 |
| | | | 705/14.39 |
| 2020/0064444 A1* | 2/2020 | Regani | G01S 7/415 |

OTHER PUBLICATIONS

Microchip Technology Inc., 25AA02E48/25AA02E64 "2K SPI Bus Serial EEPROMs with EUI-48™ or EUI-64™ Node Identity" last viewed Jun. 18, 2020.

* cited by examiner

*Primary Examiner* — Matthew Mikels
(74) *Attorney, Agent, or Firm* — Mark Nowotarski

(57) ABSTRACT

A capacity counter system has a central capacity controller, a clicker to indicate when people enter or leave an area, and a video system for displaying a running count of how many people are in the area. The controller, clicker and video system communicate wirelessly using protocols that allow the controller to communicate with a plurality of clickers while being in close proximity to other controllers serving adjacent areas.

15 Claims, 2 Drawing Sheets

CAPACITY COUNTER SYSTEM

FIELD OF INVENTION

The inventions described herein are generally in the field of capacity counting.

BACKGROUND

Establishments, such as restaurants and bars, have long had maximum capacity limits imposed by the local fire marshal or other authorities. With the advent of the COVID-19 virus, these limits have not only expanded to include virtually every possible retail location, they are now being much more strictly and actively enforced.

SUMMARY OF INVENTION

The summary of the invention is a guide to understanding the invention. It does not necessarily describe the most generic embodiment.

FIG. 1 is a plan view of a handheld "clicker" device 100.
FIG. 2 is a schematic of two capacity counting systems 200, 201.

Referring to FIGS. 1 and 2, a capacity counting system 200 or 201 provides a method to automate or semi-automate the process of capacity restriction while at the same time providing historical data concerning the total number of customers per day and the daily time blocks that have the highest number of customers entering the establishment.

The capacity counting system may comprise four primary types of components: one or more handheld "clicker" or counting devices 100, 110, 120 for tallying the entering and departing customers, a Central Capacity Controller (CCC) 202, one or more wall-mounted video displays 204, and a smart phone, tablet or other portable programmable communications device 206 running a custom application. The systems may also support being interfaced with automated people counters (not shown).

Regardless of the method employed for tallying customers, the counting devices communicate wirelessly 208 with the CCC, and the CCC communicates wirelessly 210 with the portable programmable communications device 206. Due at least in part to the wireless communications described below, up to 24 CCCs can operate simultaneously within a close geographical area, with each CCC supporting up to 32 clickers. This means that multiple stores 222, 224 in establishment-heavy areas, such as malls, could each operate their own system 200, 201 independently without interference. The system can be used to tally persons in any area, such as a park, or street, or any volume such as a building.

DETAILED DESCRIPTION

The detailed description describes non-limiting exemplary embodiments. Any individual features may be combined with other features as required by different applications for at least the benefits described herein. As used herein, the term "about" means plus or minus 10% of a given value unless specifically indicated otherwise.

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

As used herein, a "computer-based system", "computer implemented device", or similar designation, comprises an input device for receiving data, an output device for outputting data in tangible form (e.g. printing or displaying on a computer screen), a permanent memory for storing data as well as computer code, and a digital processor for executing computer code wherein said computer code resident in said permanent memory will physically cause said digital processor to read-in data via said input device, process said data within said digital processor and output said processed data via said output device.

As used herein, the term "shaped" means that an item has the overall appearance of a given shape even if there are minor variations from the pure form of said given shape.

As used herein, the term "generally" when referring to a shape means that an ordinary observer will perceive that an object has said shape even if there are minor variations from said shape.

As used herein, relative orientation terms, such as "up", "down", "top", "bottom", "left", "right", "vertical", "horizontal", "distal" and "proximal" are defined with respect to an initial presentation of an object and will continue to refer to the same portion of an object even if the object is subsequently presented with an alternative orientation, unless otherwise noted.

Clicker

Figure 1:
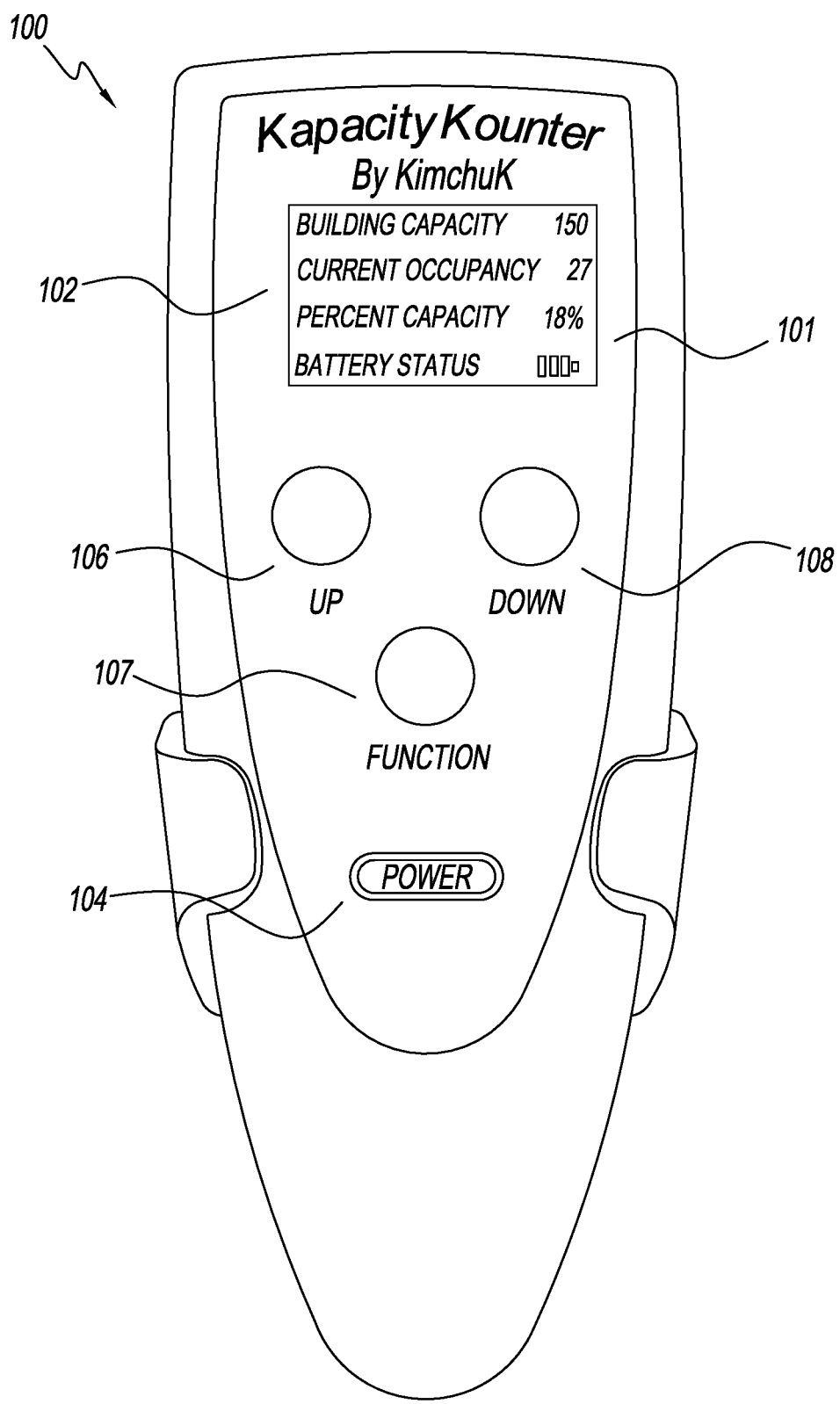
FIG. 1 is a plan view of a handheld clicker device 100.

As illustrated in FIG. 1, each store employee who is responsible for tracking the entering and exiting customers carries a computer implemented clicker 100. Exemplary major hardware components of the clicker are as follows: PIC microcontroller, 2.4 GHz industrial/science/medical (ISM) radio module, real time clock, 48-bit UUID chip, rechargeable lithium ion battery, and LCD display 102. The clicker also has an overlay 101 containing three tactile pushbuttons: On/Off (or "function") 107, Count Up 106, and Count Down 108. A power button 104 may also be provided. The On/Off button 107 toggles the clicker power on and off or disables (112, 122 FIG. 2) either the enter 106 or exit 108 buttons for one-function use. The Count Up 106 and Count Down buttons 108 are pressed one time whenever a customer enters 216 or leaves 218 a given area, respectively. The current count (i.e., sum of entrance and exit clicks) may be displayed on the clicker's screen (e.g., liquid crystal display (LCD)) 102 and reported wirelessly 208 in real time to the CCC 202.

Recharging of the clicker's battery may be accomplished via a standard micro USB port or optional docking charger (not shown). The battery voltage may be divided down to appropriate levels and fed to an analog-to-digital input on the PIC. This input acts as a voltage monitor that allows the battery state of charge to be displayed on the LCD. The battery may be expected to last well beyond the length of a two-shift typical work shift without needing to be recharged.

The internal ISM radio of the clicker may be completely self-contained and requires no external antenna. It has a globally unique ID (e.g., UUID) and may be configured as an end node in a star network. When a clicker is powered on, it performs a brief self-test and then begins scanning all available channels for a locally operating CCC. It may continue to scan either until it is powered off or until it detects a live network. Assuming that it detects a working CCC, the clicker may broadcast its presence and attempt to join the network, sending its globally unique UUID to the CCC. During the search and join process, the clicker's LCD 102 may display status to the store employee.

Each CCC 202 may have a pre-configured list containing the UUID of every clicker or counter that "belongs" to it. If a clicker belonging to another establishment's capacity counting system attempts to join the CCC's network, it may be rejected. However, if the CCC detects that the clicker in question is indeed part of its network, it sends a wireless acknowledgement message to the clicker. This message contains the current date and time so that the clicker's real time clock may be synchronized to the CCC's clock. The clicker is now ready for operation.

Central Capacity Controller

Figure 2:
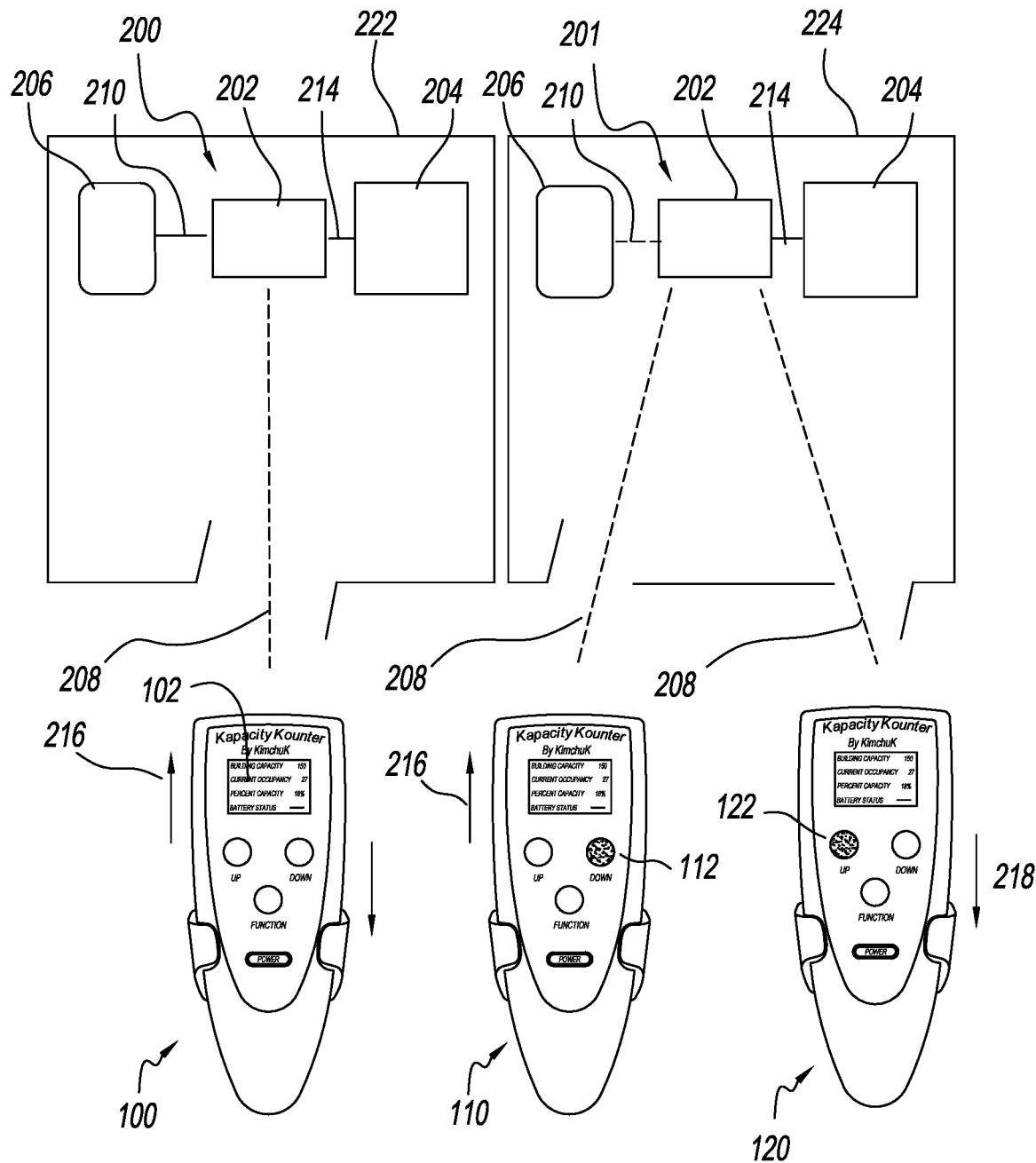
FIG. 2 is a schematic of two capacity counting systems 200, 201.

As illustrated in FIG. 2, the CCC 202 is the central node of a system's network. All system messages are either originated by or else pass through the CCC on their way to their final destination. The CCC's hardware may comprise a PIC microcontroller, 2.4 GHz ISM radio module, Bluetooth® or Zigbee radio module, EEPROM for non-volatile storage of system parameters and historical data, coin cell backed real time clock, Power On LED, heartbeat LED, battery status LEDs, rechargeable lithium ion battery or other battery, and USB serial port. There may also be a port for charging the battery and a power on/off switch. Although the CCC may be primarily designed to be powered via a standard wall outlet, it may also operate for several hours from its internal battery.

The CCC may be configured as the controller in a star network. When it is powered up, it begins to operate on whichever of the 24 possible ISM radio channels it has been configured for by the system administrator. It creates a star network on this channel and begins listening for clickers in the vicinity. When a clicker is detected, its ID may be checked against a stored table of IDs associated with that particular CCC. If a match is found, it may be allowed to join the network, and the CCC sends a date/time message to the clicker to synchronize it to the system.

The CCC's USB port can be used for offline system configuration via a laptop or desktop PC running any number of readily available terminal emulation programs such as HyperTerminal or Real Term. Alternatively, the portable programmable communications device (e.g. Android® smart phone app) can be used for configuration. Parameters such as desired radio channel, UUIDs of the available clickers, current date and time, maximum capacity, and maximum permitted capacity can be programmed and stored in non-volatile EEPROM.

The ISM radio may be used to communicate with the clickers in real time. As the Count Up and Count Down buttons are actuated on the various clickers, the CCC retains a running count of the customers present in the establishment. It then sends this information to both the wall-mounted display(s) as well as the portable programmable communications device (e.g. smart phone). The CCC's Bluetooth® or Zigbee radio 210 may be the link used to communicate with the smart phone or tablet application. All configuration, control, and status messages may be shared between the CCC and the application via this radio.

Software may be made available to report traffic distribution, peak attendance, and other statistical marketing information.

Wall Display(s)

The wall display or displays 204 are envisioned to be either inexpensive flat screen televisions or else custom displays. Regardless of the display type used, its input signal may be obtained from the CCC via either a hard-wired cable or else via a Wi-Fi-type wireless link 214. If it is hard-wired, it may connect to the HDMI video input of the display. Inexpensive HDMI splitters and HDMI extension cables are available and could be used to provide parallel drive signals to two or more displays separated by some distance. A wireless display would be subject only to the limitations of the establishment's Wi-Fi connectivity.

The video system may display real time capacity parameters in large, easily readable text and graphics. In addition, varying background colors and audio tones may provide feedback whenever the allowable capacity limits are approached or exceeded.

Smart Phone Application

A smart phone application may be used as an alternative to the CCC's USB port for system configuration. It may also allow real time monitoring and control of system status, as well as providing the provision for storage and retrieval of time-stamped statistical average attendance and peak attendance data.

Conclusion

While the disclosure has been described with reference to one or more different exemplary embodiments, it will be understood by those skilled in the art that various changes may be made and equivalents may be substituted for elements thereof without departing from the scope of the disclosure. In addition, many modifications may be made to adapt to a particular situation without departing from the essential scope or teachings thereof. Therefore, it is intended that the disclosure not be limited to the particular embodiment disclosed as the best mode contemplated for carrying out this invention.

We claim:

1. A capacity counter system comprising:
 a) a computer implemented central capacity controller;
 b) a computer implemented first clicker; and
 c) a computer implemented video system
 wherein:
 d) said first clicker comprises:
   i) at least one of:
     1) an up button to indicate an entry of a person into an area; or
     2) a down button to indicate an exit of a person from said area; and
   ii) a wireless communication device;
 e) said video system comprises:
   i) a video display; and
   ii) a wireless communication device;
 f) said central capacity controller comprises:
   i) a first wireless communication device adapted to communicate with said wireless communication device of said first clicker;
   ii) a second wireless communication device adapted to communicate with said wireless communication device of said video system; and
   iii) computer code to cause said central capacity controller to:
     1) receive from said first clicker via said first wireless communication device, an indication of a person entering or leaving said area;
     2) increase or decrease a running count of persons in said area based on said received indication from said first clicker; and
     3) transmit said running count of persons to said video system in real time via said second wireless communication device such that said running count of persons may be indicated on said video display in real time
wherein:
g) said central capacity controller is configured to implement a star network with respect a plurality of computer implemented clickers;
h) said first clicker comprises a first ID;
i) said central capacity controller comprises an allowable ID; and
j) said central capacity controller is adapted to join said first clicker into said star network when said first ID matches said allowable ID.

2. The capacity counter system of claim 1 wherein:
a) said first wireless communication device is adapted to communicate with said wireless communication device of said first clicker using an ISM protocol; and
b) said second wireless communication device is adapted to communicate with said wireless communication device of said video system using a Wi-Fi protocol.

3. The capacity counter system of claim 1 which further comprises:
a) a computer implemented portable programmable communication device
wherein:
b) said portable programmable communications device comprises a wireless communication device;
c) said central capacity controller comprises a third wireless communication device; and
d) said third wireless communication device is adapted to communicate with said wireless communication device of said portable programmable communications device using a Bluetooth® or Zigbee protocol.

4. The capacity counter system of claim 3 wherein said portable programmable communications device is a smart phone or tablet.

5. The capacity counter system of claim 1 which further comprises a computer implemented second clicker wherein:
a) said first clicker comprises an active up button, but not an active down button
b) said second clicker comprises:
i) an active down button but not an active up button; and
ii) a wireless communications device;
c) said central capacity controller is adapted to:
i) increase said sum of persons in said area upon receipt of an activation of said up button of said first clicker; and
ii) decrease said sum of persons in said area upon receipt of an activation of said down button of said second clicker.

6. The capacity counter system of claim 1 wherein said first ID is a unique ID.

7. The capacity counter system of claim 1 wherein said first clicker is a handheld device.

8. A capacity counter system comprising:
a) a computer implemented central capacity controller;
b) a computer implemented first clicker;
c) a computer implemented second clicker; and
d) a computer implemented video system
wherein:
e) said first clicker comprises:
i) an active up button but not an active down button; and
ii) a wireless communication device;
f) said second clicker comprises:
i) an active down button but not an active up button; and
ii) a wireless communication device;
g) said video system comprises:
i) a video display; and
ii) a wireless communication device;
h) said central capacity controller comprises:
i) a first wireless communication device adapted to communicate with said wireless communication devices of said first clicker and said second clicker;
ii) a second wireless communication device adapted to communicate with said wireless communication device of said video system; and
iii) computer code to cause said central capacity controller to:
1) receive from said first clicker via said first wireless communication device, an indication of a person entering said area;
2) to receive from said second clicker via said first wireless communication device, an indication of a person leaving said area;
3) increase or decrease a running count of persons in said area based on said received indications from said clickers; and
4) transmit said running count of persons to said video system in real time via said second wireless communication device such that said running count of persons may be indicated on said video display in real time.

9. The capacity counter system of claim 8 wherein:
a) said first wireless communication device is adapted to communicate with said wireless communication device of said first clicker using an ISM protocol; and
b) said second wireless communication device is adapted to communicate with said wireless communication device of said video system using a Wi-Fi protocol.

10. The capacity counter system of claim 8 which further comprises:
a) a computer implemented portable programmable communication device
wherein:
b) said portable programmable communication device comprises a wireless communication device;
c) said central capacity controller comprises a third wireless communication device; and
d) said third wireless communication device is adapted to communicate with said wireless communication device of said portable programmable communication device using a Bluetooth® or Zigbee protocol.

11. The capacity counter system of claim 10 wherein said portable programmable communication device is a smart phone or tablet.

12. The capacity counter system of claim 8 wherein said central capacity controller is configured to implement a star network with respect a plurality of computer implemented clickers.

13. The capacity counter system of claim 12 wherein said first clicker comprises a first ID, said central capacity controller comprises an allowable ID and wherein said central capacity controller is adapted to join said first clicker into said star network when said first ID matches said allowable ID.

14. The capacity counter system of claim 13 wherein said first ID is a unique ID.

15. The capacity counter system of claim 8 wherein said first clicker is a handheld device.

* * * * *